United States Patent [19]
Tidland

[11] Patent Number: 5,601,182
[45] Date of Patent: Feb. 11, 1997

[54] PRECISION FEED CHAIN

[76] Inventor: John W. Tidland, 3408 NE. Corbin Rd., Vancouver, Wash. 98686

[21] Appl. No.: 312,763

[22] Filed: Sep. 27, 1994

[51] Int. Cl.⁶ .................................................. B65G 15/42
[52] U.S. Cl. ...................... 198/692; 198/803.01; 198/841
[58] Field of Search .............................. 198/692, 803.01, 198/841, 851, 852, 853; 144/245 A, 245.2

[56] References Cited

U.S. PATENT DOCUMENTS

| | | | |
|---|---|---|---|
| 1,746,697 | 2/1930 | Eaglesfield | 144/245 A |
| 1,809,054 | 6/1931 | Mattison | 198/853 |
| 2,006,612 | 7/1935 | Williams | 198/852 |
| 3,785,416 | 1/1974 | Anthony | 198/692 |
| 4,231,464 | 11/1980 | Neilson | 198/456 |
| 4,886,156 | 12/1989 | Records et al. | 198/841 |
| 5,439,097 | 8/1995 | Takahashi et al. | 198/851 |

*Primary Examiner*—Joseph E. Valenza
*Attorney, Agent, or Firm*—Marger, Johnson et al.

[57] ABSTRACT

A high precision feed chain includes multiple support platforms that are each rigidly attached to master links in a drive chain. The master links are pivotally coupled together forming a single continuous drive chain capable of advancing in a longitudinal direction. The support platforms and the drive chain run along a channel in a guide assembly. The guide assembly allows the chain to advance in the longitudinal direction while at the same time maintaining the support platforms in a stable latitudinal and horizontal orientation.

10 Claims, 6 Drawing Sheets

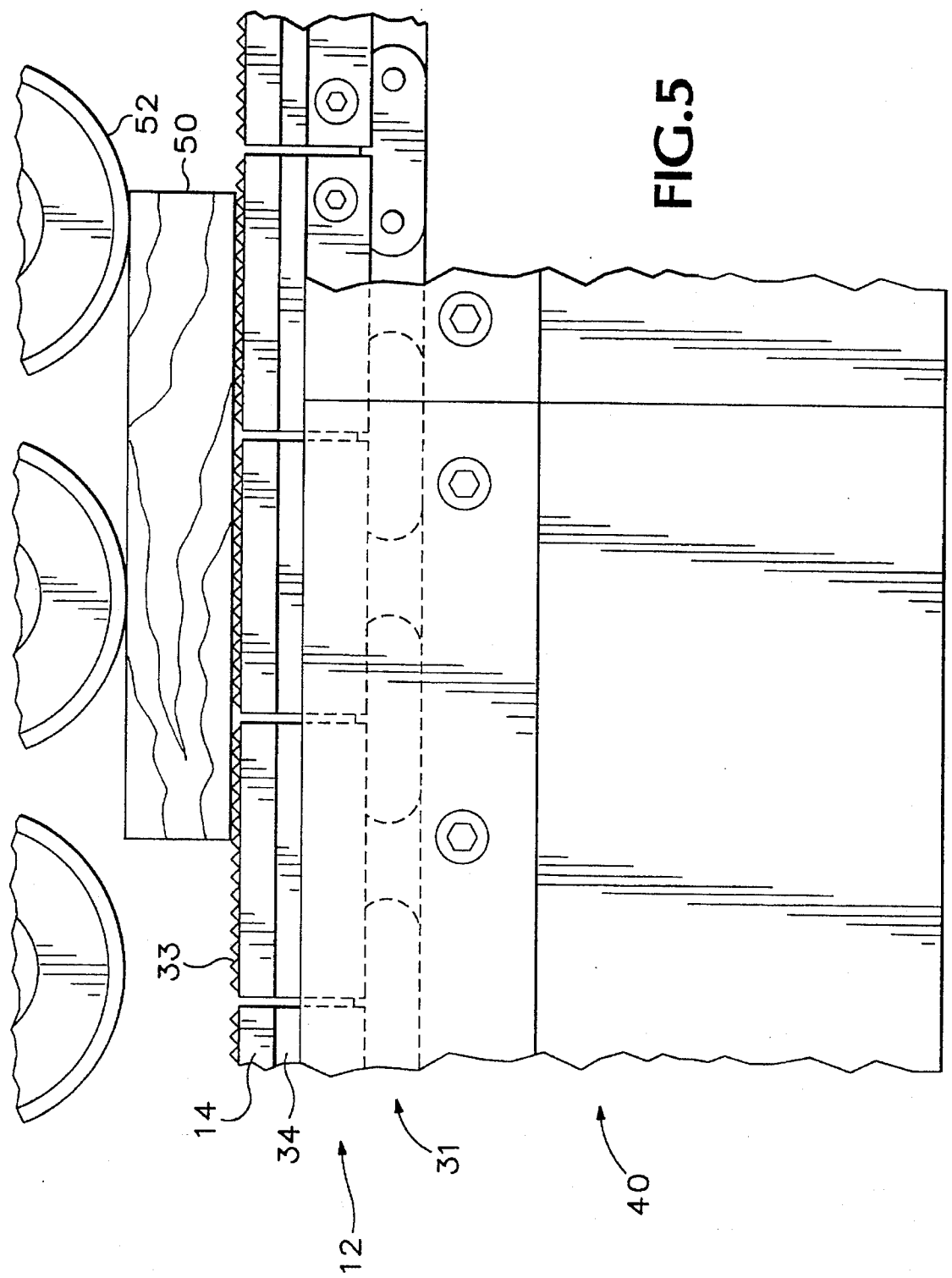

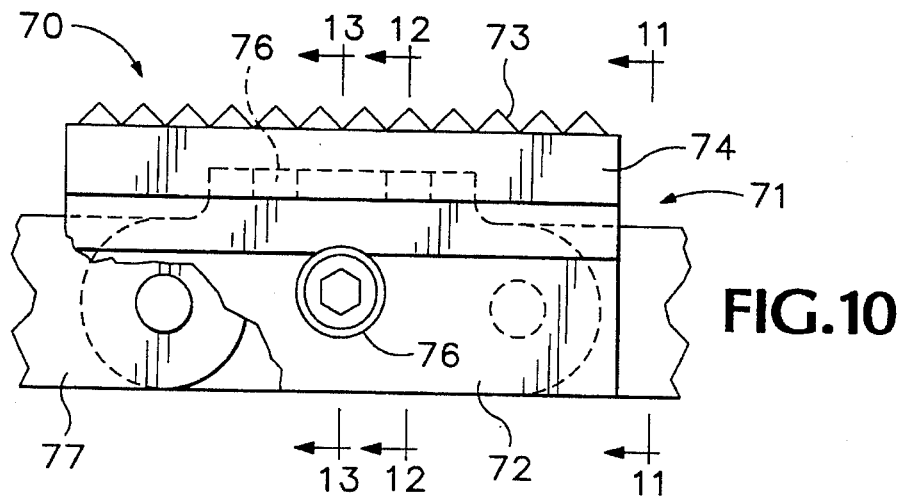
FIG. 10
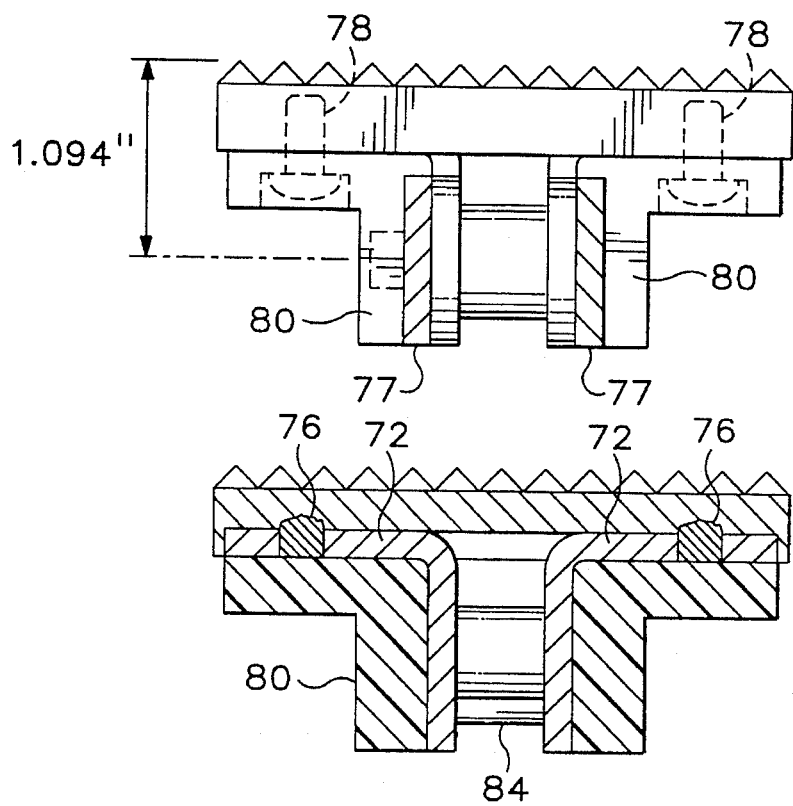
FIG. 11
FIG. 12
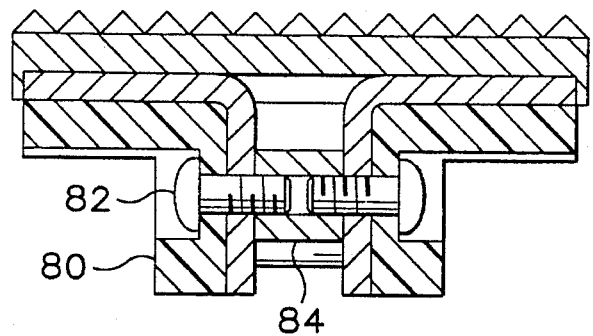
FIG. 13

PRECISION FEED CHAIN

BACKGROUND OF THE INVENTION

This invention relates generally to conveyers and more particularly to a high precision feed chain for accurately guiding objects through various processing equipment.

Conveyer systems are used to transport different articles such as timber, consumer goods, and manufactured goods along a given path during different stages of processing. For example, conveyer systems move logs through different stages of edging and cutting that eventually form the log into a board.

Various monitoring and processing equipment, such as electronic vision recognition systems, are utilized in conjunction with the conveyer to analyze the shape, condition and position of articles as they travel on the conveyer. For example, vision recognition systems are used to identify knots and imperfections in raw lumber and, in addition, identify the position of the lumber in relation to the conveyer. The calculated position is then relayed to cutting and chipping machinery that cut the log into a desired shape.

Due to the timber shortage, it is highly desirable and cost effective to maximize the total amount of finished lumber capable of being extracted from each log. Thus, expensive laser system and vision recognition systems have been developed for use in conjunction with conveyer systems to increase the precision of cutting and other processing of raw timber.

While the electronic technology used for identifying and cutting lumber has significantly improved, the accuracy of the overall cutting process is still limited by the mechanical conveyer system used for transporting the lumber. For example, standard conveyer systems use a belt or chain system that supports and transports the timber while being processed. However, the belt or chain of a conveyer system, while moving in a semi-controlled longitudinal direction, can also move laterally back and forth and vertically up and down due to vibration, slippage, etc. When the conveyer moves in an uncontrolled lateral or horizontal direction, the reference point of the log in relation to the conveyer changes. If cutting or other processing equipment starts processing the object on the conveyer based on a previously defined reference point, the processing equipment will cut the log in the wrong location. For example, a chipper may cut too far into the side of a log, in turn, destroying usable portions of the log. In addition, if the log is moving due to conveyer vibration, the machinery will not cut the lumber smoothly, further degrading the quality of the finished lumber.

In addition to uncontrolled lateral movement, objects on conveyers change longitudinal position due to conveyer belt slippage and slippage between of the object and the top contact surface of the conveyer. Longitudinal slippage also causes the log to be cut at a different location than what was initially identified by the automated cutting equipment.

Accordingly, a need remains for a conveyer system that can hold and transport object in a highly stable precise manner for more accurate processing.

SUMMARY OF THE INVENTION

It is, therefore, an object of the invention to increase precision of automated processing equipment.

Another object of the invention is to reduce uncontrolled and uncalculated movement of objects while being transported on a conveyer system.

A further object of the invention is to increase the quality and yield of products processed on a conveyer system.

A high precision feed chain maintains a constant lateral and horizontally aligned orientation when transporting articles in a controlled longitudinal direction. By preventing the feed chain from moving in a lateral and horizontal direction, a constant reference point is provided for the different processing equipment used on the transported article. Thus, cutting, assembling, and other process operations can be performed with higher precision.

The feed chain includes multiple support platforms that are each rigidly attached to master links. The master links are pivotally linked together forming a single continuous drive chain that advance the support platforms in a guided longitudinal direction. The support platforms and the drive chain run along a channel in a guide assembly.

The guide assembly directs the feed chain in a given longitudinal direction while at the same time maintaining the support platforms in a stable latitudinal and horizontal position. Wear slides are attached to each support platform providing a low resistive surface between the support platforms and the guide assembly.

A top member of the support platform is formed into various shapes according to the specific application. For example, the top member can have a concave cross-sectional shape for holding small diameter objects such as small logs. The top member also includes multiple polyhedrons that protrude upward forming a highly resistive serrated surface that prevents slippage. Alternatively, multiple elongated "V-shaped" protrusions extend upward and traversely across the top member, allowing controlled movement of objects on the top surface of the support platform.

The foregoing and other objects, features and advantages of the invention will become more readily apparent from the following detailed description of a preferred embodiment of the invention which proceeds with reference to the accompanying drawings.

BRIEF DESCRIPTION OF THE DRAWINGS

FIG. 5 is a side view of the feed chain and guide assembly shown in FIG. 4.

FIG. 10 is a side elevation view of the feed chain shown in FIG. 9.

FIG. 11 is a first front sectional view of the feed chain shown in FIG. 10.

FIG. 12 is a second front sectional view of the feed chain shown in FIG. 10.

FIG. 13 is a third front sectional view of the feed chain shown in FIG. 10.

DETAILED DESCRIPTION

Figure 1:
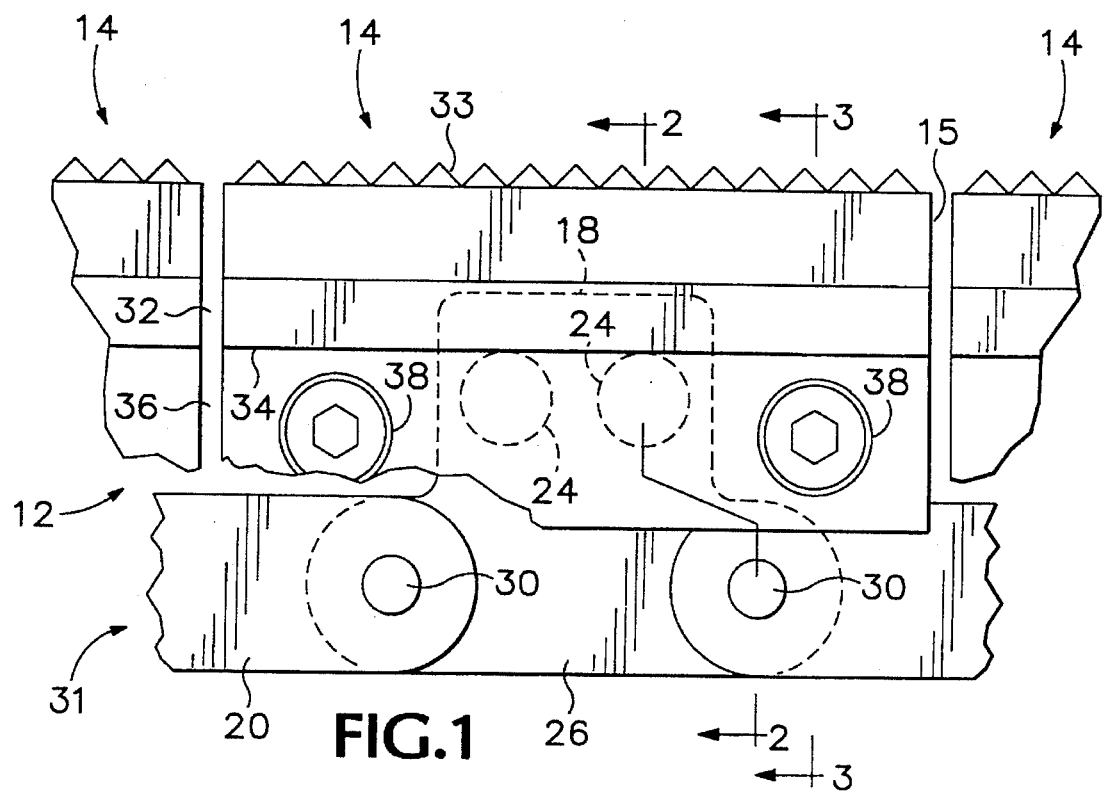
FIG. 1 is a side view of a feed chain according to the invention.
Figure 2:
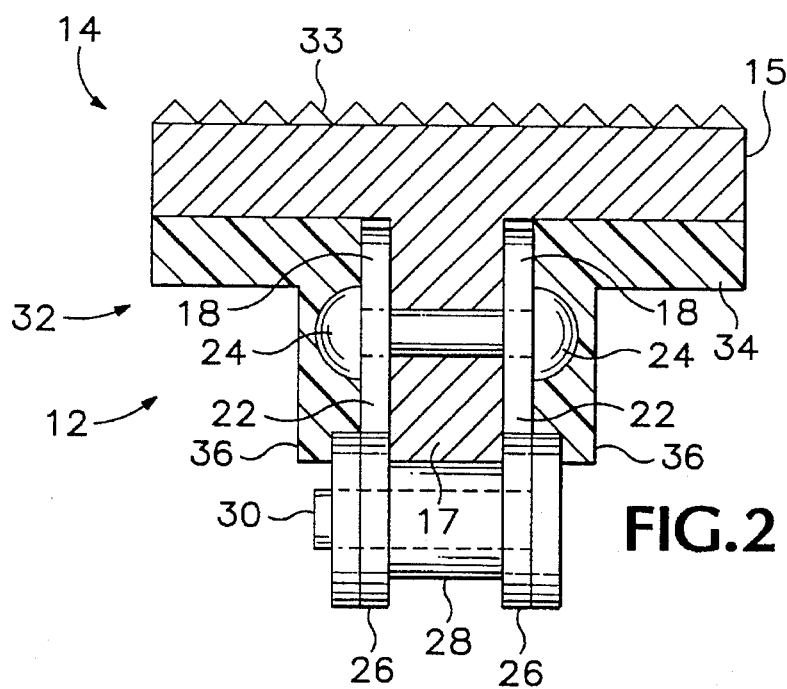
FIG. 2 is a first front section view of the feed chain shown in FIG. 1.
Figure 3:
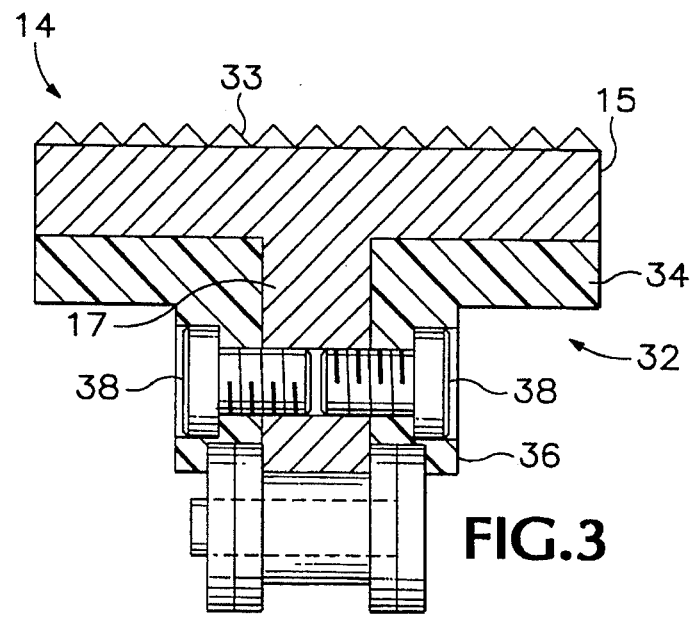
FIG. 3 is a second front section view of the feed chain shown in FIG. 1

Referring to FIGS. 1–3, a feed chain 12 includes multiple steel support platforms 14 each having a top member 15 joined at a bottom end with a downwardly directed bottom member 17. The bottom member 17 includes opposite sides 22. The top member is horizontally aligned and the bottom member is vertically aligned forming a "T" cross-sectional shape.

A pair of clamp plates 18 are clamped onto the opposite sides 22 of bottom member 17 by a pair of rivets 24. The bottom end of each clamp plate 18 is formed into a master link 26. Master links 26 on opposite sides of the bottom member 17 are joined together at a front end and a back end with rods 28.

Chain links 20 are pivotally joined between adjacent master links 26 with a pin 30. The master links 26 and chain links 20 form a drive chain 31 that is attached together in a continuous loop. The drive chain 31 is driven by a sprocket (not shown) that in turn rotates the support platforms around in a vertically aligned oval. The clamp plates 18, master links 26, and the coupling links 20 define coupling means for coupling the support platforms together.

A plastic "L-shaped" wear slide 32 is attached onto each side 22 of each support platform 14. Each wear slide 32 includes a horizontal portion 34 and a vertical portion 36. A set of bolts 38 clamp the wear slides 32 onto the sides of bottom member 17. Multiple polyhedron shape protuberances extend upward from the top of support platform 14 forming a serrated surface 33.

Figure 4:
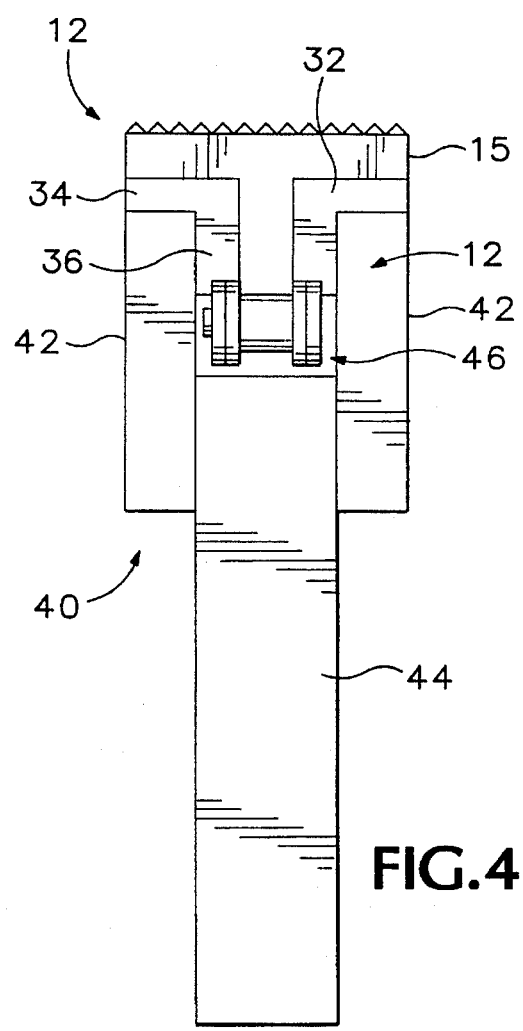
FIG. 4 is a front view of the feed chain shown in FIG. 1 inserted inside a guide assembly.

FIG. 4 is a front view of the feed chain 12 shown in FIG. 1 inserted inside a guide assembly 40. The guide assembly 40 includes a guide bar 44 having side walls 42 bolted onto opposite sides. The guide bar 44 and the side walls 42 form a "U-shaped" cavity 46 that receives the feed chain 12. The vertical portion 36 of wear slide 32 resides snugly between the support platform 14 and an inside face of the guide assembly channel 46. The horizontal portion 34 of wear slide 32 resides between the support platform 14 and the top of side walls 42.

In one embodiment, the top member 15 of each support platform 14 is approximately 3.25 inches wide and 3.875 inches long. However, it is understood that the size of the support platform varies according to the type of objects and processing performed in conjunction with the feed chain.

The wear slides 32 are made of a ultra high molecular weight plastic providing a smooth low resistance surface between each support platform 14 and the guide assembly 40. The wear slides eliminate having to lubricate the contact surface between the support platforms and the guide assembly, in turn, reducing the overall amount of lubricants and the amount of maintenance required to operate the feed chain.

The internal channel 46 of the guide assembly 40 snugly receives each support platform 14 thereby allowing the feed chain to advance in a longitudinal direction while at the same time preventing the support platforms from moving in a latitudinal or horizontal direction. Thus, the feed chain 12 holds objects supported on surface 33 in the same lateral and horizontal reference location while proceeding in a longitudinal direction through guide assembly 40.

FIG. 5 is a side view of the feed chain 12 and the guide assembly 40. A piece of lumber 50 is transported on top of the feed chain 12. A set of hydraulic rollers 52 hold the lumber firmly against the top surface 33 of support platforms 14. A drive motor having a sprocket (not shown) is attached to the drive chain 31 moving each support platform 14 first through the channel of support assembly 40, underneath the support assembly, and then back around through the support assembly in a continuous circular manner.

The support platforms 14 by being chained together serve as a conveyer for moving the lumber 50 or any other article through various processing equipment such as cutters, chippers, etc. Because, the feed chain 14 rides snugly inside channel 46 (FIG. 4) of guide assembly 40, any article carried on top of the feed chain maintains a high precision horizontal and lateral reference location while traveling in the direction of the guide assembly. Thus, process equipment can perform operations on the transported objects with higher precision than standard conveyer systems.

Further, the drive chain 31 used for coupling adjacent support platforms together provides more longitudinal motion control than conveyer systems having belts. For example, belts used on conveyer systems can slip causing any object on the belt to deviate from an expected location. The feed chain uses a standard C-2080 conveyer chain for drive chain 31. Thus, the support platforms cannot ship, in turn, preventing errors in processing due to corresponding changes in the longitudinal position of target objects carried on the conveyer.

Figure 6A:
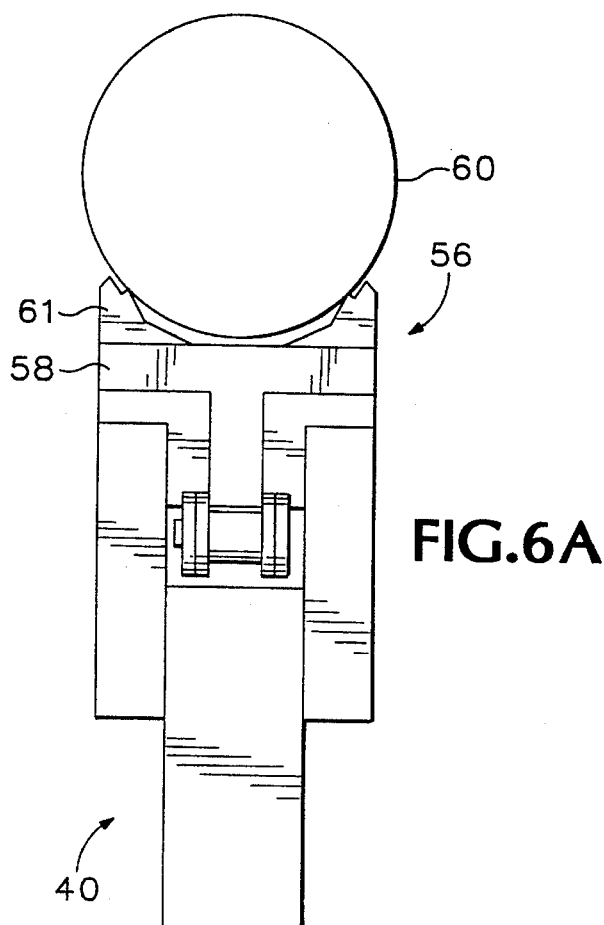
FIGS. 6A and 6B are a second embodiment of a support platform according to the invention.
Figure 6B:
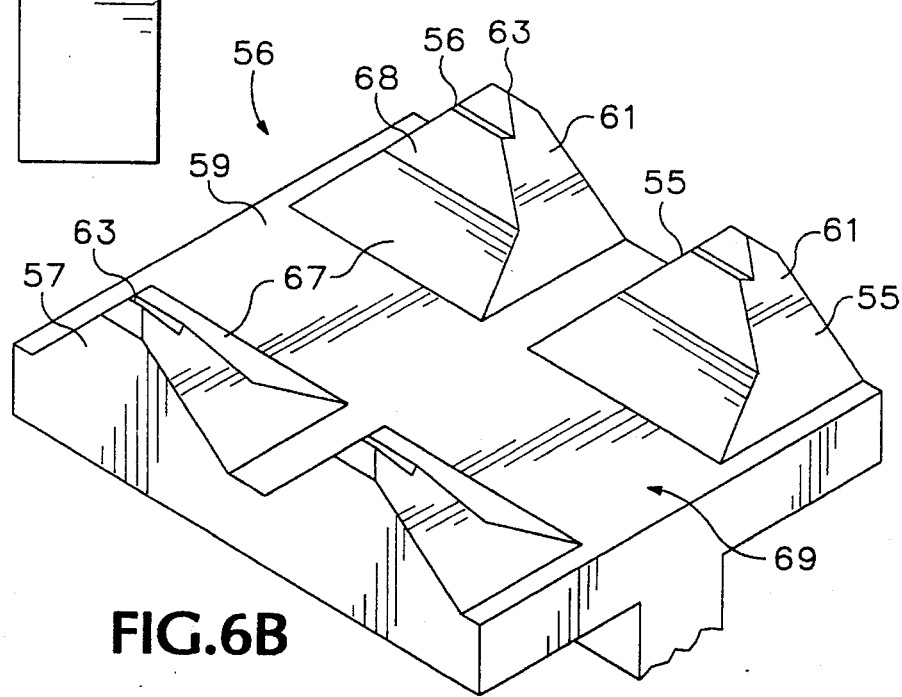

Referring to FIGS. 6A and 6B, a feed chain support platform 56 includes a top member 58. Four jaws 61 extend upward from each corner of a top surface 59 of top member 58. Each jaw 61 includes a lower inclining front face 67 extending up from the top surface 59 to a second inclining front face 68. A top edge of the second inclining face 68 forms a lower lip 65. A rear face of the jaw 61 extends vertically up from the side of top member 58 and inclines at a top edge forming an upper lip 63. Side faces 55 of each jaw 61 incline in opposite directions moving closer together toward the top and further apart toward the top surface 59. Thus, the jaw has a substantially parahedron shape.

The opposite lateral jaws 61 form an elongated U-shaped channel 69 along a longitudinal axis of the support platform 56. The upper and lower lips 63 and 65, respectively, secure a log 60 at a constant lateral reference point while being transported along the guide assembly 40 (FIG. 1). The U-shaped top surface of top member 58 provides additional support against the lateral sides of log 60 preventing the log from sliding in either a left or right direction. The upper and lower lips provide discrete contact points on the opposite lateral sides of log 60. The lower lip 65 provides contact points for smaller diameter logs and lip 63 provides contact points for larger diameter logs.

The support platform can be formed into any of a wide variety of different shapes which would further conform to the type of object transported on the feed chain. Thus, the specific shape of the support platform can be customized to increase adhesion of objects to the top surface of the support platform.

Figure 7:
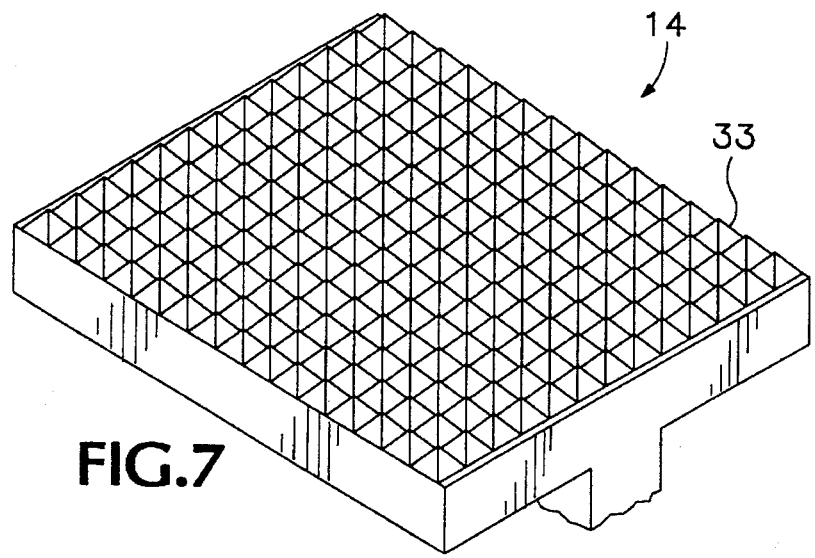
FIG. 7 is a perspective view of a support platform for the feed chain shown in FIG. 1.

FIG. 7 is a perspective view of the top surface 33 of the support platform 14 shown in FIG. 1. The tetrahedral shape of the protrusions on the top surface 33 provide a rigid serrated surface for preventing objects from sliding in either a front-to-back or a side-to-side direction in relation to support platform 14. It is also understood that other types of abrasive surfaces, such as sandpaper or tacky glue type materials, can be used to prevent the transported objects from slipping on the top surface of the support platform 14.

Figure 8:
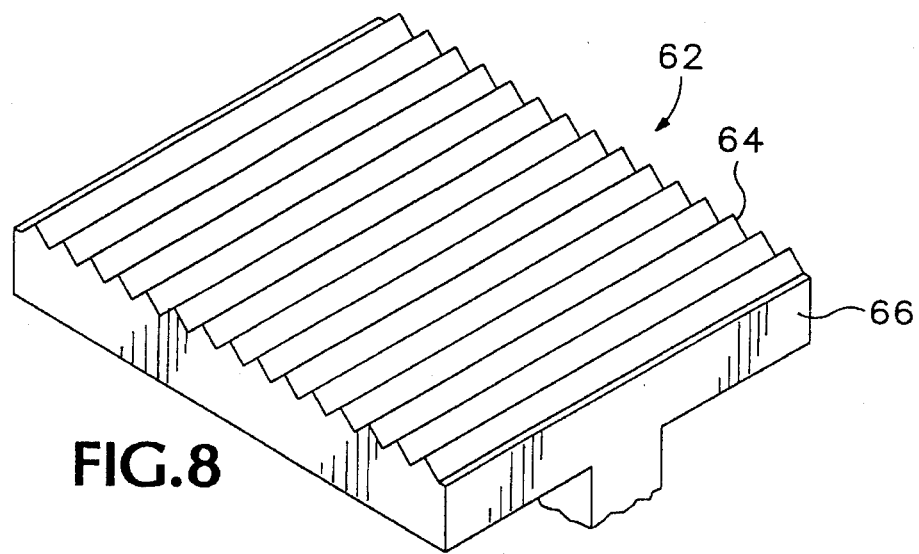
FIG. 8 is another embodiment of a support platform according to the invention.

FIG. 8 shows another embodiment of a support platform 62 according to the invention. Multiple elongated "V-shaped" protrusions 64 extend upward and traversely across a top member 66. Support platform 62 enables objects to slide in a lateral direction while preventing the object from moving in a front-to-back direction. For example, to optimize cutting lumber processing often require logs to be shifted in various direction after being set on the conveyer system. The support platform 62 allows timber to be shifted laterally on the support platform while resisting movement in a front to back direction.

Figure 9:
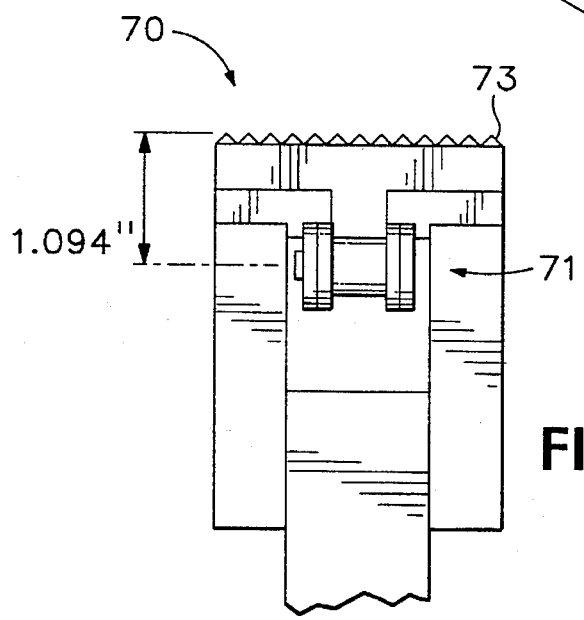
FIG. 9 is a front elevation view of a high-speed feed chain according to another embodiment of the invention.

FIG. 9 a front section view of an alternative embodiment of a feed chain 70. Feed chain 70 is similar to feed chain 14 previously shown in FIG. 1. However, in feed chain 70 the distance from the top serrated surface 73 to the center of drive chain 71 is significantly less than the same associated distance in feed chain 14. For example, in a preferred embodiment, the distance from serrated surface 73 to the center 71 of drive chain 71 is approximately 1.094 inches.

The shorter distance between surface 73 and the center of the drive chain lowers the center of gravity of the feed chain, in turn, reducing the centrifugal force exerted by the feed chain as it travels around the conveyer system. Thus, the feed chain 70 can operate at a faster speed without asserting additional centrifugal force against the various members of the overall system.

FIGS. 10–13 are views of the feed chain shown in FIG. 9. A drive chain 71 includes a pair of clamp plates 72 each having an inverted "L" shape that is spot welded through holes 76 to opposite lateral sides of the bottom surface of support member 74. A round spacer 84 is tack welded between the inside walls of clamp plates 72 holding the clamp plates in an aligned position. The spacer 84 has a threaded center for engaging with screws 82. The screws 82 serve to hold wear slides 80 to opposite sides of clamp plates 72. Wear slides 80 are clamped to the top of each clamp plate 72 by bolts 78.

The master link formed at the bottom of each pair of clamp plates are interlocked with chain links 77 in a manner similar to that described in FIGS. 1 and 2. Thus, the feed chain 70 shown in FIGS. 9–13 provides a high precision and high speed means for carrying articles.

Having described and illustrated the principles of the invention in a preferred embodiment thereof, it should be apparent that the invention can be modified in arrangement and detail without departing from such principles.

I claim all modifications and variation:

1. A feed chain comprising:

multiple support platforms each having a top member and at least one downwardly directed bottom member;

coupling means for pivotally joining adjacent support platforms together forming a single continuous chain capable of advancing in a longitudinal direction;

an elongated guide assembly for supporting the support platforms, the guide assembly having an internal channel for snugly receiving the bottom member of each support platform thereby allowing the chain to advance in said longitudinal direction while at the same time maintaining the support platforms in a stable latitudinal and horizontal orientation; and plastic wear slides attached to the support platform for providing a low resistive surface between said support platform and the guide assembly, the plastic wear slides each including a vertical portion snugly positioned between the support platform and an inside face of the guide assembly channel and a horizontal portion for supporting the top member above the guide assembly.

2. A feed chain according to claim 1 wherein said at least one downwardly directed member comprises clamp plates that attach to the opposite sides of each support platform and, each clamp plate extending down below the support platform forming a master link that is pivotally joined at each end to an adjacent master link by chain links which are part of the coupling means.

3. A feed chain according to claim 2 wherein each clamp plate has an inverted "L" shape that is welded to a bottom surface of the support platform.

4. A feed chain according to claim 2 including a spacer joined between the clamp plates for holding the clamp plates in alignment.

5. A feed chain according to claim 4 wherein the spacer includes a threaded center hole that is aligned on each end with holes located in each clamp plate, the aligned holes of the spacer and clamp plates each receiving a bolt.

6. A feed chain according to claim 1 wherein the top member of the support platform has a concave cross-sectional shape.

7. A feed chain, comprising:

multiple support platforms each having a top member for supporting articles and a downwardly directed bottom member having opposite lateral sides, each support platform aligned on an opposite end with an adjacent support platform;

coupling means for pivotally joining adjacent support platforms together forming a single continuous chain capable of advancing in a longitudinal direction, the coupling means comprising clamp plates rigidly joined to each support platform, each clamp plate formed at a bottom end into a master link that extends below the associated bottom member;

a guide assembly for maintaining the support platforms in a constant laterally and horizontally aligned orientation while the chain advances in said longitudinal direction, the guide assembly including a channel that contains the coupling means while at the same time receiving and supporting the support platforms; and two "L-shaped" wear slides attached to opposite lateral sides of each support platform, each wear slide having a horizontal section that rides on a top surface of the support assembly and a vertical section that resides between the support member and the support assembly channel.

8. A feed chain according to claim 7 including multiple elongated "V-shaped" protrusions that extend upward and traversely across the top member.

9. A feed chain according to claim 7 wherein the coupling means comprise clamp plates rigidly joined to each support platform, each clamp plate formed at a bottom end into a master link that extends below the associated bottom member.

10. A feed chain according to claim 7 including one jaw extending from each corner of each support platform, each jaw having an inclining front face forming a single elongated U-shaped channel in each top member.

\* \* \* \* \*